United States Patent [19]

Deaver

[11] 3,942,560

[45] Mar. 9, 1976

[54] SAFETY STOP FOR PRESSURIZED PIPELINE

[75] Inventor: Royce D. Deaver, Houston, Tex.

[73] Assignee: Exxon Research & Engineering Co., Linden, N.J.

[22] Filed: Aug. 20, 1974

[21] Appl. No.: 499,059

[52] U.S. Cl. ................................... 138/89; 137/1
[51] Int. Cl.² ........................................ F16L 55/10
[58] Field of Search ............. 61/72.1, 72.3; 138/89, 138/90, 94, 94.3, 94.5; 137/1

[56] References Cited
UNITED STATES PATENTS
3,746,026   7/1973   Herring................................. 138/90

Primary Examiner—Houston S. Bell, Jr.
Attorney, Agent, or Firm—F. Donald Paris

[57] ABSTRACT

A method and apparatus for stopping a malfunctioning sealing device which is being propelled inside a pipeline by pneumatic pressure from being expelled out of the pipeline at the laybarge end. The apparatus comprises a plurality of normally retracted gripping jaws and a bumper at its rear end. When impact is made with the bumper by, for example, a sealing device such as a pig being propelled through the pipeline, the gripping jaws which are mechanically linked with the bumper are caused to expand against the inner pipe surface such that the apparatus is secured in place within the pipeline, thereby preventing the pig from being propelled out of the line onto the laybarge.

10 Claims, 3 Drawing Figures

SAFETY STOP FOR PRESSURIZED PIPELINE

BACKGROUND OF THE INVENTION

During the installation and contruction of an offshore underwater pipeline, pneumatic pressure may be applied internally to the pipeline to prevent it from collapsing or buckling from external pressure. Especially in deep water offshore pipeline construction internal pressure is applied to prevent any radial collapse of the line due to the extremely high pressure exerted against it by the surrounding water. In order to limit the weight of the normally unsupported pipeline between the laybarge and the ocean floor, the pressure generally will be applied pneumatically. Sealing devices such as pigs are required internally of the pipeline and usually near the barge in order to maintain the various sections of the assembled pipeline under an internal pressure. In the event that a sealing device malfunctions and does not hold in place the pig normally would be expelled out of the pipeline onto the laybarge like a cannonball because of the potential energy of the pressurized pipeline. This possibility presents a very serious and dangerous situation which the present invention precludes from happening.

The specific prior art references considered with respect to the present invention include the following U.S. Pat. Nos.:

| | |
|---|---|
| 2,607,370 | 3,197,195 |
| 2,615,413 | 3,381,714 |
| 2,672,161 | 3,495,626 |
| 2,747,690 | 3,503,424 |
| 2,807,937 | 3,525,226 |
| 2,823,634 | 3,561,320 |
| 2,974,685 | 3,561,490 |
| | 3,593,749 |

The foregoing prior art relate to conventional pipeline pigs and plugs and generally disclose the known expedient of providing actuatable means for gripping engagement with the interior wall of the pipe upon occurrence of a predetermined condition. None of the prior art, however, discloses the construction and arrangement of the subject invention per se or in combination with the movable pig which actuates the safety stop apparatus, or the functional interrelationship between the safety stop apparatus which is operable when the sealing pig comes in contact therewith.

SUMMARY OF THE INVENTION

It is an object of the present invention to provide an improved method and apparatus for use during offshore pipeline construction to prevent expulsion from pressurized pipelines of a malfunctioning sealing device.

A more specific object of this invention is to provide means for stopping a rapidly moving pipeline sealing device used during the construction of offshore pipelines under pressure.

Another object of this invention is to provide safety means for stopping a sealing device which malfunctions and is caused to be expelled out of the pressurized pipeline.

Still yet another object of the present invention to provide a method for use in offshore pipeline construction wherein the pipeline is maintained under pressure, for preventing a malfunctioning sealing device from being expelled out of the pipeline.

In accordance with these and other objects of this invention, the safety means basically comprises a combination of gripping jaws, bumper, rollers and a mechanical linkage for operating the gripping jaws. The device is adapted for movement inside the pipeline when the gripping jaws are located in a first normally retracted position by a centrally located spring which maintains the jaws out of contact with the pipe. Upon impact from an object such as a moving sealing pig within the pressurized pipeline, the gripping jaws are automatically extended into a second position in contact with the inner pipe surface such that the jaws hold and stay in place as long as the force of impact is acting against the device. The gripping jaws can be retracted from their holding position by applying a suitable tension force from the front end of the device. The device also can be provided with pneumatic control and retrieval lines that pass through it in operable communication with the sealing device on the rear side thereof, while permitting the application of pneumatic pressure to the pipeline.

DESCRIPTION OF A PREFERRED EMBODIMENT

Figure 1:
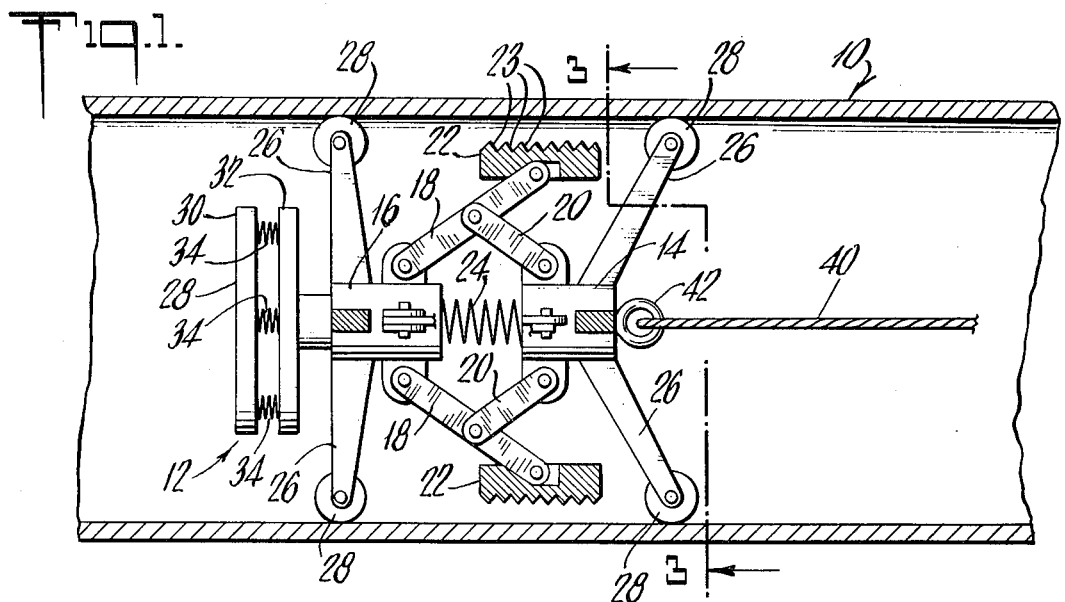
FIG. 1 is a partial cross-sectional view through a pipeline showing schematically in elevation the safety device according to the present invention with the gripping jaws in their retracted position.

Referring now to the drawings wherein similar parts are designated by the same reference numerals throughout the several views, there is shown in FIG. 1 a portion of a typical pipeline 10 which is undergoing construction offshore at a location, for example, in relatively deep water. As shown, within the pipeline 10 there is provided a safety mechanism in the form of a stop generally designated 12 in its retracted inoperable position. The stop 12 basically comprises a front or forward main body portion 14 interconnected to a rear main body portion 16 by linkage means comprising pivotally mounted lever arms 18 each of which pivots at one end on the rear member 16 and second lever arms 20 which are shorter than the lever arms 18. The arm 20 is pivotally mounted at one end substantially midway between the extremities of the arm 18 and at its opposite end is pivotally mounted to the forward body 14. At the opposite or free end of each lever arm 18 there is pivotally carried an arcuate-shaped ridged gripping jaw 22 (see FIG. 3) adapted for engagement with the inner surface of the pipeline 10. The gripping jaw 22 extends in a generally longitudinal direction of the pipeline and comprises a plurality of ridges 23 such that the surface thereof directly adjacent and facing the inner surface of the pipeline has a series of such ridges extending transversely and shaped to conform with the inner pipe surface so that when the jaws move into gripping engagement (see FIG. 2) with the inner surface of the pipe they hold the safety stop in place. Four gripping jaws 22 are shown (see FIG. 3) and each operates in substantially the same manner via the lever arms 18 and 20. However, additional gripping jaws may be provided about the inner circumference of the pipeline if desired. Further, various modifications of the lever arm or linkage arrangement for supporting the gripping jaws may be utilized for purposes of the present invention. The main body portions 14 and 16 are maintained in spaced relation, as shown in FIG. 1, by means of a centrally located compression spring 24 which exerts an outward end force on each of the respective body portions such that the jaws 22 are maintained as shown in FIG. 1 in their retracted or inoperable position.

The safety stop also is provided with a plurality of legs 26 extending from the front housing 14 and the rear housing 16 toward the pipe. Each leg 26 supports a roller 28 which enables the mechanism to be moved through the pipeline in a relatively easy and simple manner when the gripping jaws are retracted. As previously explained, pressurized pipelines are often employed in offshore pipeline construction to prevent buckling or prevent collapse thereof, and when used it is very likely that a malfunction may occur in the sealing device or pig which is normally employed to maintain predetermined sections of the pipeline under such pressure. In the event that such a malfunction occurs and the pig does not hold in its normal position, then the pressure in that pipeline section will cause the pig to be expelled toward the front of the pipeline and out of the laybarge end onto the laybarge just like a cannonball, because of the potential energy of the pneumatic pressure in the pipeline. The safety stop will prevent the rapidly moving sealing pig from being expelled by the annular bumper means 28 extended from the rear portion 16 of the safety stop. The bumper typically may comprise a pair of resiliently connected annular plates 30 and 32 interconnected by resilient means such as springs 34 which receive the impact of the propelled sealing pig 36. This is best shown in FIG. 2 where upon impact of the sealing pig 36 with the bumper 28 the gripping jaws 22 automatically are caused to extend against the inner pipe surface since the force of impact is greater than the force of the compression spring 24 which maintains the housings 14 and 16 in their spaced relationship such that the gripping jaws are retracted (see FIG. 1).

Figure 2:
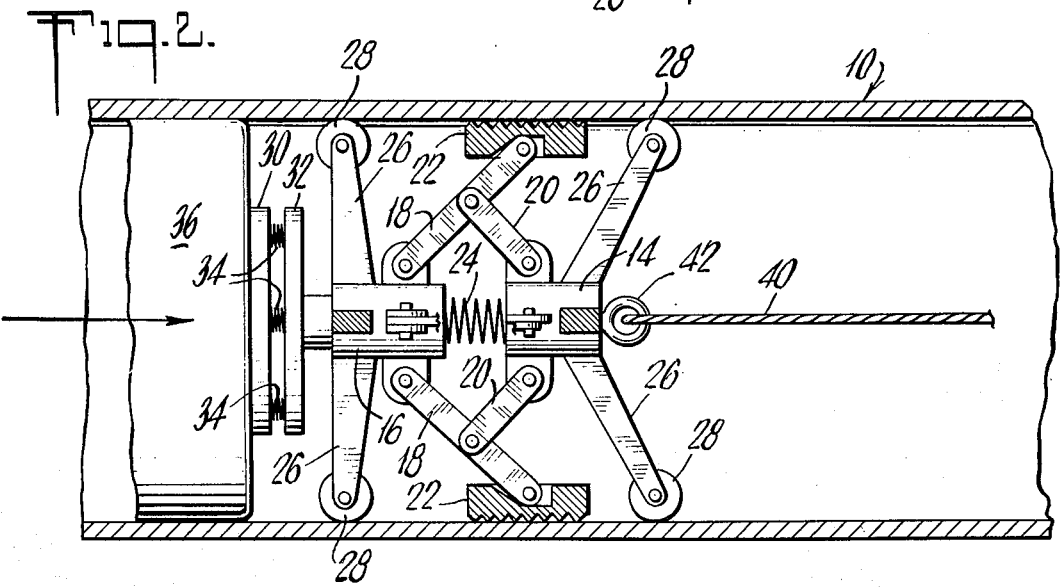
FIG. 2 is the same view as FIG. 1 only showing an object such as a sealing pig or other such sealing device for a pressurized pipeline impacting with the subject safety stop mechanism with the gripping jaws located in their extended or pipe surface gripping position.
Figure 3:
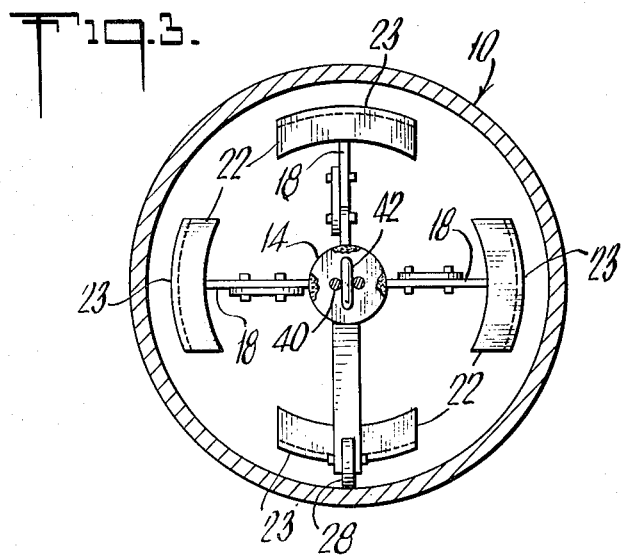
FIG. 3 is a cross-sectional view taken on substantially the line 33 of FIG. 1 as seen from the front end of the pipeline under construction.

In order to retract the gripping jaws from their extended or holding position there is provided a line or cable 40 connected at one end to an eyelet 42 secured to the forward portion of the front housing 14 and extending through the pipeline out through the open end thereof onto the laybarge where an automatic means such as a conventional winch applies tension to the cable which causes the gripping jaws 22 to retract from their extended position of FIG. 2 into their retracted position of FIG. 1.

The safety stop can be designed to accommodate various pneumatic control and retrieval lines by making it hollow either completely or at predetermined locations such that these lines can pass through the stop into operable association with the sealing pig for automatically controlling it and also for the application of pneumatic pressure to the pipeline section located rearwardly of the particular sealing pig.

Although a particular embodiment of the invention has been shown and described and various modifications thereof have been suggested, it will be understood that the true spirit and scope of the invention is set forth in the appended claims which embrace other modifications and embodiments which will occur to those of ordinary skill in the art.

What is claimed is:

1. A safety mechanism for use in the construction of offshore pipeline wherein at least a portion of said pipeline is under pressure, comprising sealing means for maintaining said portion of said pipeline under pressure, a housing including a rear portion and a front portion, a plurality of circumferentially arranged gripping jaws extending from said housing, bumper means extending from said rear portion toward said portion of said pipeline under pressure and facing in the direction of said sealing means, means operably connected with said housing for facilitating movement of said mechanism through said pipeline, linkage means connecting said gripping jaws with said front and rear portions such that said gripping jaws can be located at least in retracted or extended positions, means for interconnecting said front and rear portions such that said gripping jaws are normally maintained in said retracted position, whereby said gripping jaws are extended into their extended position upon impact by said sealing means with said bumper means.

2. The safety mechanism of claim 1 wherein said means for facilitating movement of said mechanism through said pipeline comprises a plurality of rollers in operable engagement the said pipeline.

3. The safety mechanisms of claim 1, wherein said means for interconnecting said front and rear portions comprises a compression spring.

4. The safety mechanism of claim 1, wherein said linkage means comprises a plurality of pairs of levers, each of said pairs comprising a first lever pivotally connected at one end to said rear portion and to one of said gripping jaws at the opposite end thereof, and a second lever pivotally connected at one end to said front portion and pivotally connected with said first lever and the opposite end thereof.

5. The safety mechanism of claim 1, wherein each of said gripping jaws comprises an arcuate-shaped configuration substantially complementary to the inner surface of said pipeline.

6. The safety mechanism of claim 5, wherein each of said gripping jaws includes a plurality of serations on the surface thereof facing said pipeline for securing said mechanism in place when said jaws are in their extended position.

7. The combination of a safety stop and a moveable sealing device located within a pressurized pipeline wherein said moveable device seals off pressurized sections of said pipeline, said safety stop located in front of said sealing device, said safety stop including bumper means at the rear thereof facing said sealing device and gripping means which is actuated upon impact of said bumper means with said sealing device, said safety stop being constructed and arranged such that said gripping means is located in a normally retracted position and in an extended position in contact with the inner surface of said pipeline upon impact of said moveable sealing device with said bumper means, and means for facilitating movement of said safety stop through said pipeline when said gripping means is disposed in its normally retracted position.

8. The combination of claim 7, wherein said safety stop includes a compression spring for maintaining said gripping means in their normally retracted position.

9. A method for use in offshore pressurized pipeline construction to prevent a malfunctioning sealing device from being expelled out of said pipeline due to the pressure in said pipeline, comprising the steps of:
  a. pressurizing a section of said pipeline by sealing said section with a sealing device and thereafter applying pressure to said section;
  b. providing abutment means in said pipeline in front of the pressurized section and facing said sealing device, said means normally being moveable through said pipeline and being releasably secured in place in said pipeline upon impact therewith by said malfunctioning sealing device such that said means engages the inner surface of said pipeline and prevents said sealing device from being expelled out of said pipeline.

10. The method of claim 9 including the step of:
  c. releasing said stop from being secured in place in said pipeline after said malfunctioning sealing device has been repaired.

* * * * *